(12) United States Patent
Ban et al.

(10) Patent No.: US 12,386,410 B2
(45) Date of Patent: Aug. 12, 2025

(54) PROCESSOR POWER CONSUMPTION CONTROL METHOD, SYSTEM, AND ELECTRONIC APPARATUS

(71) Applicant: Lenovo (Beijing) Limited, Beijing (CN)

(72) Inventors: Xueli Ban, Beijing (CN); Zhijian Mo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 112 days.

(21) Appl. No.: 18/183,370

(22) Filed: Mar. 14, 2023

(65) Prior Publication Data

US 2023/0324976 A1   Oct. 12, 2023

(30) Foreign Application Priority Data

Mar. 31, 2022   (CN) .......................... 202210334926.9

(51) Int. Cl.
*G06F 1/32*   (2019.01)
*G06F 1/3234*   (2019.01)

(52) U.S. Cl.
CPC .................................. *G06F 1/3234* (2013.01)

(58) Field of Classification Search
CPC .................................................. G06F 1/3234
See application file for complete search history.

(56) References Cited

U.S. PATENT DOCUMENTS

| | | | |
|---|---|---|---|
| 2016/0378168 A1* | 12/2016 | Branover | G06F 1/3203 713/323 |
| 2019/0163251 A1* | 5/2019 | Gada | G06F 1/329 |
| 2022/0330148 A1* | 10/2022 | Kim | H04W 52/02 |

OTHER PUBLICATIONS

Difference between AI processor and normal processor, retrieved from the internet at <https://web.archive.org/web/20211207212313/https://www.rfwireless-world.com/Terminology/Difference-between-AI-processor-and-normal-processor.html> (Year: 2021).*

* cited by examiner

*Primary Examiner* — Stefan Stoynov
(74) *Attorney, Agent, or Firm* — ANOVA LAW GROUP, PLLC

(57) ABSTRACT

A processor power consumption control method includes responding to a processor being woken up, obtaining an operating parameter of a system by the processor when the system is in an operating state, determining a current operating scenario of the system based on the operating parameter, and configuring data related to a wake-up frequency of the processor based on the current operating scenario. Different the wake-up scenarios correspond to different wake-up frequencies of the processor.

14 Claims, 4 Drawing Sheets

---

Respond to the processor being woken up by an interrupt event, obtaining a setting parameter of the system by the processor when the system is in the operating state — S51

Determine the current operating scenario of the system based on the setting parameter — S52

Adjust a wake-up threshold for waking up the processor in the sleep mode based on the current operating scenario, different wake-up thresholds corresponding to different operating scenarios — S53

PROCESSOR POWER CONSUMPTION CONTROL METHOD, SYSTEM, AND ELECTRONIC APPARATUS

CROSS-REFERENCE TO RELATED APPLICATION

This application claims priority to Chinese Patent Application No. 202210334926.9, filed on Mar. 31, 2022, the entire content of which is incorporated herein by reference.

TECHNICAL FIELD

The present disclosure relates to the processor field and, more particularly, to a processor power consumption control method, a system, and an electronic apparatus.

BACKGROUND

When a system is in a normal operating state, processing events of a plurality of sensors need to be executed. A processor needs to perform processing events of each sensor to ensure that the processing events of the sensors are completed smoothly. Thus, the processor needs to be in a normal operating state when the system is in a normal operating state, which causes unnecessary power consumption by the system.

SUMMARY

Embodiments of the present disclosure provide a processor power consumption control method. The method includes responding to a processor being woken up, obtaining an operating parameter of a system by the processor when the system is in a operating state, determining a current operating scenario of the system based on the operating parameter, and configuring data related to a wake-up frequency of the processor based on the current operating scenario. Different wake-up scenarios correspond to different wake-up frequencies of the processor.

Embodiments of the present disclosure provide a power consumption control system of an AI processor, including a first controller and an AI processor. The first controller is configured to control a system to operate. The AI processor has a wake-up mode and a sleep mode and includes an acquisition unit, a determination unit, and a configuration unit. The acquisition unit is configured to respond to the AI processor being woken up and obtain an operating parameter when the system is in a operating state. The determination unit is configured to determine a current operating scenario of the system based on the operating parameter. The configuration unit is configured to configure data relevant to a wake-up frequency of the AI processor based on the current operating scenario. Different operating scenarios correspond to different wake-up frequencies of the AI processor.

Embodiments of the present disclosure provide an electronic apparatus, including a first controller and an AI processor. The first controller is configured to control an operation of a system where the electronic apparatus is located. The AI processor is configured to respond to the AI processor being woken up, obtain an operating parameter from the first controller by the AI processor when the system is in a operating state, determine a current operating scenario of the system based on the operating parameter, and configure data relevant to a wake-up frequency of the AI processor based on the current operating scenario. Different operating scenarios correspond to different wake-up frequencies of the AI processor.

In the processor power consumption control method, system, and electronic apparatus of the present disclosure, the processor can include the wake-up mode and the sleep mode. In response to the processor being woken up, the processor can obtain the operating parameter of the system when the system is in the operating state. The current operating state of the system can be determined based on the operating parameter. The data relevant to the wake-up frequency of the processor can be configured based on the current operating scenario. Different operating scenarios can correspond to different wake-up frequencies. In the technical solution, the data relevant to the wake-up frequency of the processor can be adjusted based on the operating parameter of the processor when the system is in the operating state. Thus, when the system has different operating parameters in the operating state, the system can have different data that is relevant to the wake-up frequencies of the processor. Therefore, when the system is in the operating state, the processor can be in the wake-up mode or the sleep mode based on the operating state of the system, which prevents the processor from being always in the wake-up mode to increase the power consumption of the system when the system is in the operating state.

DETAILED DESCRIPTION OF THE EMBODIMENTS

The technical solutions of embodiments of the present disclosure are described in detail below in connection with the accompanying drawings of embodiments of the present disclosure. Described embodiments are only some embodiments of the present disclosure, not all embodiments. All other embodiments obtained by those of ordinary skill in the art without creative effort are within the scope of the present disclosure.

Figure 1:
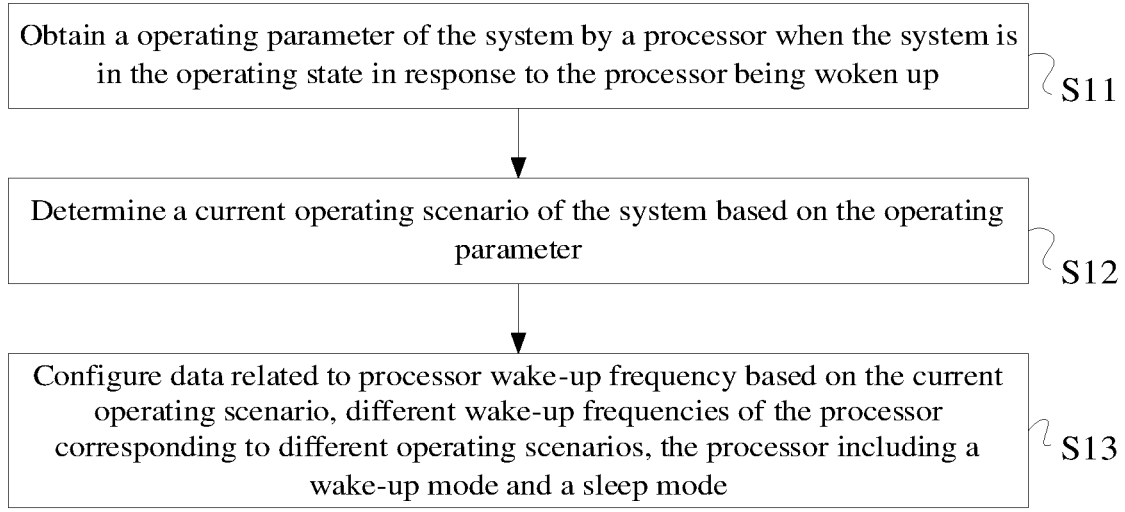
FIG. 1 illustrates a schematic flowchart of a processor power consumption control method according to embodiments of the present disclosure.

The present disclosure provides a processor power consumption control method. A flowchart of the method is shown in FIG. 1. The method includes the following processes.

At S11, the processor is configured to obtain an operating parameter of the system in the operating state in response to the processor being wakened.

At S12, a current operating scenario of the system is determined based on the operating parameter.

At S13, data related to the wake-up frequency of the processor is configured based on the current operating scenario. Wake-up frequencies of the processor corresponding to different operating scenarios are different. The processor includes a wake-up mode and a sleep mode.

When the system is in a normal operating state S0, a plurality of sensors on the system can be in the operating state. To process the data of the sensors, the processor needs to be in the wake-up mode all the time. If the processor is always in the wake-up mode, the power consumption of the system can be increased.

To avoid this situation, when the system is in the operating state, the processor can be adjusted based on different operating parameters in the technical solution to cause the processor to be in the wake-up mode or the sleep mode to reduce the power consumption of the system.

The processor can include the wake-up mode and the sleep mode. In the wake-up mode, the processor can receive processing data normally. In the sleep mode, the processor cannot perform data processing. The power consumption of the processor in the sleep mode can be lower than the power consumption of the processor in the wake-up mode. That is, when the system is in the normal operating state, the processor can have two different modes. When the system is in state S0, the processor can be in the wake-up mode or the sleep mode. When the processor is in the sleep mode, the power consumption of the system can be reduced in state S0.

That is, an idle processing mechanism can be added to the processor. That is, when the system is in state S0, if the processor is determined to be in an idle state, and the data processing does not need to be performed, the processor can be controlled to be in the sleep mode to reduce the power consumption of the system. When the system is in state S0, if the processor is determined to be always in the operating state, that is, in a data processing state, the processor can remain in the wake-up mode and does not need to be switched to the sleep mode.

Thus, whether the processor is in the sleep mode or the wake-up mode can be determined based on whether the processor is in an idle state.

When the processor is in the sleep mode, the processor cannot perform the data processing. When the processor is woken up from the sleep mode, that is, the processor is switched from the sleep mode to the wake-up mode, the processor can perform the data processing. Meanwhile, the processor needs to determine when to be switched to the sleep mode or determine when to be switched to the wake-up mode after being switched to the sleep mode.

After the processor is in the wake-up mode, the processor can determine when to be switched to the sleep mode, or when to be switched to the wake-up mode after being switched to the sleep mode, which can be determined based on the current operating parameters of the system obtained by the processor.

The operating scenario where the system is located can be determined based on the operating parameters of the system. Different operating parameters can correspond to different operating scenarios. Different types of operating parameters can correspond to different types of operating scenarios. An operating parameter with different values can correspond to different operating scenarios. Correspondingly, different operating scenarios can correspond to different data that is related to the wake-up frequency of the processor.

The data related to the processor wake-up frequency, that is, the data based on which the processor can be controlled to be switched from the sleep mode to the wake-up mode. The data can be data of the processor or data outside of the processor that impacts the wake-up of the processor.

Since different operating scenarios correspond to different wake-up frequencies of the processors, after the operating scenario of the system is determined based on the operating parameter of the system, the data corresponding to the operating scenario can be called. The wake-up frequency of the processor can be adjusted based on the data to realize the solution of adjusting the wake-up frequency of the processor based on the operating parameters of the system.

In some embodiments, the data related to the processor wake-up frequency can be adjusted based on the operating parameters of the processor when the system is in the operating state. Thus, the system can have different operating parameters when the system is in the operating state, and the system can have different data that is related to the wake-up frequency of the processor. Thus, when the system is in the operating state, the processor can be in the wake-up mode or the sleep mode based on the operating parameters of the system, which prevents the processor from being always in the wake-up mode to increase the system power consumption when the system is in the operating state.

Figure 2:
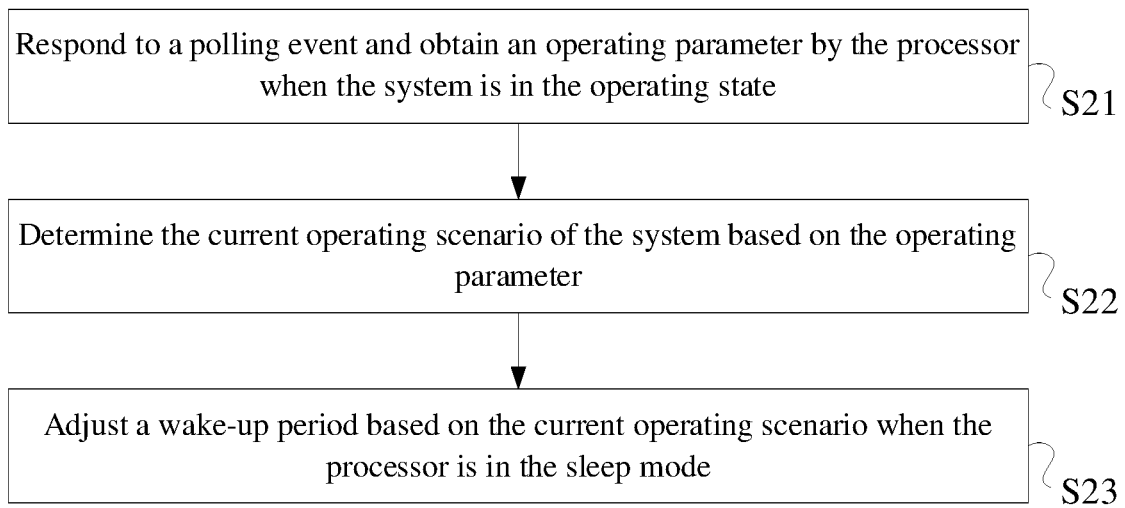
FIG. 2 illustrates a schematic flowchart of a processor power consumption control method according to embodiments of the present disclosure.

Embodiments of the present disclosure provide a processor power consumption control method. A flowchart of the method is shown in FIG. 2. The method includes the following processes.

At S21, responding to the processor being woken up includes responding to a polling event and obtaining an operating parameter by the processor when the system is in the operating state.

At S22, the current operating scenario of the system is determined based on the operating parameter.

At S23, a wake-up period is adjusted based on the current operating scenario when the processor is in the sleep mode.

The processor can be woken up in response to the polling event. That is, when the processor is in the wake-up mode, the polling event can be set. In the polling event, the processor needs to obtain data periodically. Thus, when the processor no longer needs to obtain and process the data, the processor can be switched from the wake-up mode to the sleep mode. If the processor still needs to obtain the data periodically in the sleep mode, the processor can be switched from the sleep mode to the wake-up mode at a time to obtain the data periodically. After being switched to the wake-up mode, the processor can obtain the data that needs to be obtained by the processor periodically. In this process, the processor can be woken up by the polling event.

The data that needs to be obtained periodically in the polling event can include current or voltage data of some devices. The current or voltage data can be the data of the specific devices sent by a system controller EC.

After the processor is woken up by the polling event, the processor can obtain the corresponding data based on the polling event. Meanwhile, the processor can also obtain the operating parameter of the system. That is, after the processor is woken up by the polling event, the processor needs to obtain the operating parameter of the system. Thus, the current operating scenario of the system can be determined based on the operating parameter. Then, a period of the polling event can be adjusted based on the operating scenario.

Different operating parameters can correspond to different operating scenarios, and different operating scenarios can correspond to different wake-up periods of the processor. The operating parameter can refer to a value of a certain parameter in the operation process of the system. When the operating parameter has a different value, the system can be in a different current operating scenario. Thus, the processor may need to be woken up in a different wake-up period.

Adjusting the wake-up period of the processor can include adjusting the period in which the processor is switched from the sleep mode to the wake-up mode based on the polling event. For example, when the processor is woken up by the polling event, if the wake-up period is 10 minutes, the processor can be woken up by the polling event after the processor is in the sleep mode for 10 minutes. Then, the processor can obtain the data acquired by the polling event. Then, the processor can be switched to the sleep mode. After the processor is woken up by the polling event, the current operating parameter of the system can be obtained. Then, whether the wake-up period needs to be adjusted can be determined. If the wake-up period corresponding to the operating scenario determined based on the operating parameter is 5 minutes, the period of the polling event can be adjusted to 5 minutes. That is, after the processor is woken up based on the polling event, the processor can obtain the to-be-obtained data in the polling event. Then, the processor can be switched to the sleep mode. After the processor is in the sleep mode for 5 minutes, the processor can be woken up again. The processor can be woken up not after being in the sleep mode for 10 minutes.

Obtaining the current operating parameter of the system and determining whether the wake-up period needs to be adjusted can include directly inquiring and determining the operating scenario corresponding to the current operating parameter, determining the wake-up period corresponding to the operating scenario, and directly determining the wakeup period of the processor as the current determined wakeup period if the determined wakeup period does not match with the wakeup period of the processor;

In some embodiments, after the current operating parameter of the system is obtained, whether the current operating parameter is consistent with the operating parameter obtained when the processor was woken up last time can be determined. If the current operating parameter is consistent with the operating parameter obtained last time, the current operating scenario of the system can be consistent with the operating scenario when the processor was woken up last time, and the wake-up period of the processor may not need to be adjusted. If the current operating parameter is determined to be inconsistent with the operating parameter obtained when the processor was woken up last time, the current operating scenario of the system can be inconsistent with the operating scenario when the processor was woken up last time, and the wake-up period of the processor may need to be adjusted. Then, the corresponding operating scenario can be determined based on the currently obtained operating parameter, and the wake-up period matching with the operating scenario can be determined as the wake-up period of the processor.

In the power consumption control method of the processor of embodiments of the present disclosure, if the processor is woken up by the polling event, the wake-up period of the processor in the sleep state can be adjusted based on the operating parameter of the processor when the system is in the operating state. Thus, the wake-up period of the processor in the sleep state can be related to the operating parameter of the system, which prevents the processor from being always in the wake-up mode to increase the power consumption of the system when the system is in the operating state.

Figure 3:
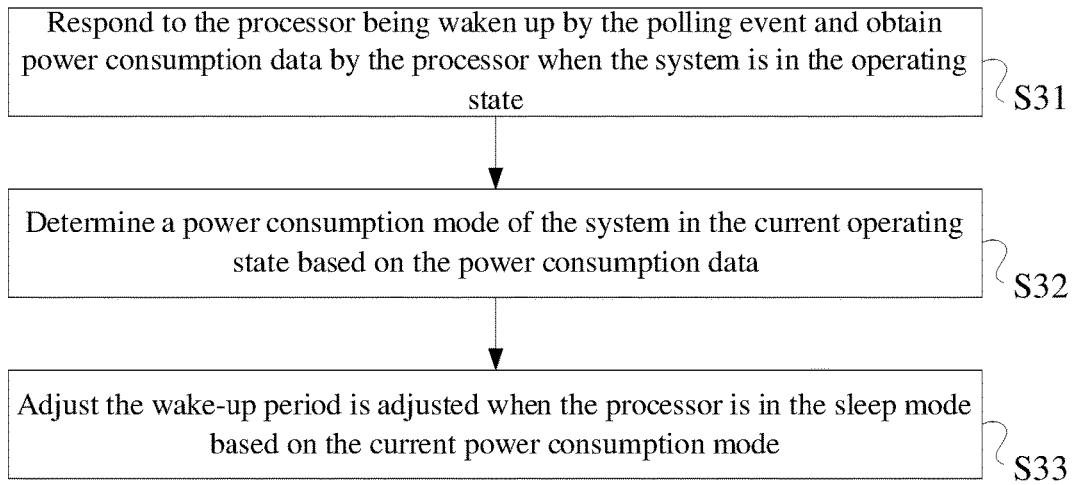
FIG. 3 illustrates a schematic flowchart of a processor power consumption control method according to embodiments of the present disclosure.

Embodiments of the present disclosure disclose a processor power consumption control method. The flowchart of the method is shown in FIG. 3. The method includes the following processes.

At S31, responding to the processor being woken up includes responding to the polling event and obtaining power consumption data by the processor when the system is in the operating state.

At S32, a power consumption mode of the system is determined in the current operating state based on the power consumption data.

At S33, the wake-up period is adjusted when the processor is in the sleep mode based on the current power consumption mode.

After the processor is woken up based on the polling event, the processor may need to obtain the power consumption data of the system in the operating state in addition to the data that needs to be obtained periodically in the polling event. The current power consumption mode of the system can be determined based on the power consumption data.

The power consumption mode of the system in normal operating state S0 can at least include a high power consumption mode (e.g. a performance mode), a middle power consumption mode (e.g. an auto performance mode), and a low power consumption mode (e.g. an auto quiet mode). In some embodiments, the power consumption mode of the system can also include a standard power consumption mode STD and an idle mode.

The system can be in the high power consumption mode (e.g. a performance mode), when the system is in a game state or a high power consumption program running state. Thus, the system power consumption can be high, and the power consumption data detected by the processor can be large. When the system is in the middle power consumption mode (e.g., an auto performance mode) in state S0, the power consumption of the system can be lower than the power consumption when the system is in the high power consumption mode. Thus, the power consumption consumed by the system in the idle mode in state S0 can be the lowest, and so on, the STD mode, the low power consumption mode (e.g. an auto quiet mode), the middle power consumption mode (e.g. an auto performance mode), and the high power consumption mode (e.g. a performance mode) in sequence.

In some embodiments, when the power consumption data of the system is in a first threshold range, the operating scenario of the system can be in the performance mode. When the power consumption data of the system is in a second threshold range, the operating scenario of the system can be in the auto performance mode. When the power consumption data of the system is in a third threshold range, the operating scenario of the system can be in the auto quiet mode.

In some other embodiments, determining the power consumption mode of the system in the current operating state based on the power consumption data of the system can include determining a corresponding power consumption mode through computation of a neural network model performed on the power consumption data. That is, modeling training can be performed on historical power consumption data to obtain a trained model. An input of the model can be the power consumption data, and an output of the model can be the power consumption mode. After the power consumption data is obtained, the power consumption data can be used as the input of the model. The output of the model can be the power consumption mode corresponding to the power consumption data.

Therefore, after the power consumption data of the system is obtained, a threshold range of the power consumption data can be directly determined, and the power consumption mode corresponding to the threshold range can be determined. Then, the wake-up period can be adjusted based on the power consumption mode. The wake-up period of the processor can be adjusted based on the power consumption mode. In some embodiments, a power consumption level corresponding to the power consumption mode can be inversely proportional to a time length of the wake-up period of the processor. That is, the higher the power consumption level corresponding to the power consumption mode is, the shorter the time length of the wake-up period of the processor is. That is, when the power consumption of the system is higher, the time length when the processor is in the sleep mode can be shorter.

When the power consumption of the system is higher, the data volume required by the system can be larger. Then, the processor may need to read the data frequently to ensure a timely manner of the data processing. Thus, the time length when the processor is in the sleep mode can be shorter. When the power consumption of the system is lower, the data volume required by the system can be smaller. Then, a number of times that the processor needs to read the data can be fewer. Thus, to reduce the power consumption of the system, the time length when the processor is in the sleep mode can be longer.

For example, if the power consumption mode of the system is the auto performance mode, the wake-up period of the processor can be determined to be a first period. If the power consumption mode of the system is determined to be the performance mode based on the power consumption data after the processor is woken up, the wake-up period of the processor can be shortened. If the power consumption mode of the system is determined to be the auto quiet mode based on the power consumption data after the processor is woken up, the wake-up period of the processor can be prolonged.

Figure 4:
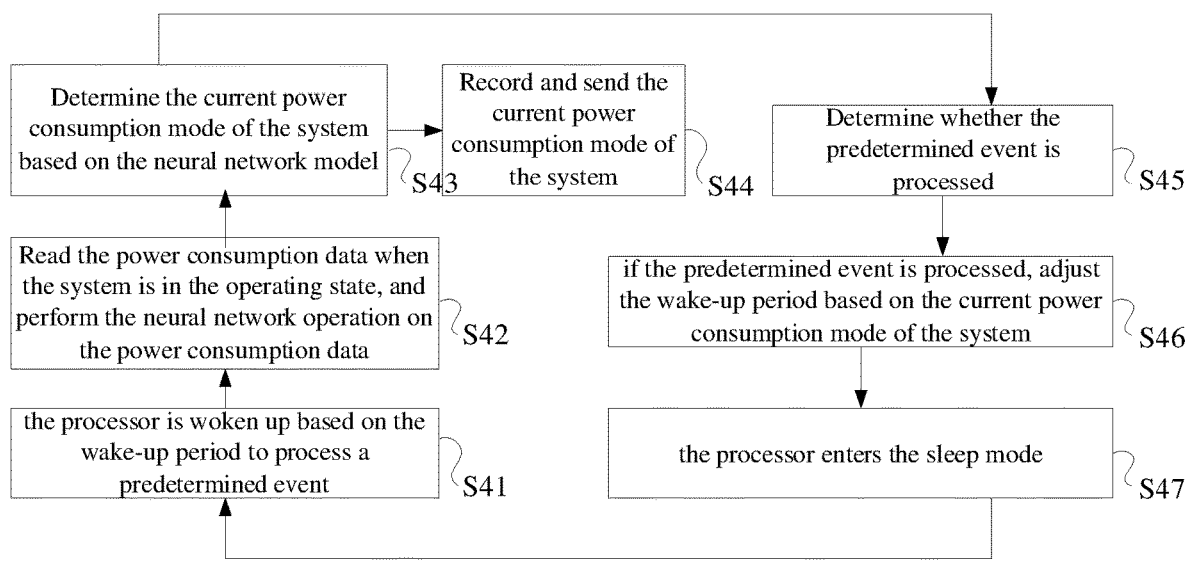
FIG. 4 illustrates a schematic flowchart of a processor power consumption control method according to embodiments of the present disclosure.

In some embodiments, FIG. 4 illustrates a schematic flowchart of the processor power consumption control method according to embodiments of the present disclosure. The method includes the following processes.

At S41, the processor is woken up based on the wake-up period to process a predetermined event.

At S42, the power consumption data is read when the system is in the operating state, and the neural network operation is performed on the power consumption data.

At S43, the current power consumption mode of the system is determined based on the neural network model.

At S44, the current power consumption mode of the system can be recorded and sent.

At S45, the processor determines whether the predetermined event is processed.

At S46, if the predetermined event is processed, the wake-up period is adjusted based on the current power consumption mode of the system.

At S47, the processor enters the sleep mode.

The predetermined event can include an event that the processor needs to periodically obtain the data after being woken up by the polling event.

In summary, the time length when the processor is in the sleep mode can be related to the wake-up period when the processor is in the sleep mode and the power consumption when the system is in the normal operating state and can be adjusted based on the power consumption when the system is in the normal operating state.

Further, if a number of times that the system is continuously in the auto quiet mode in the current state is determined to reach a predetermined number, the wake-up period when the processor is in the sleep mode can be prolonged.

If the system is determined to be in the auto quiet mode based on the power consumption data, and the number of times that the system is in the auto quiet mode is determined to reach the predetermined number, the system can be indicated to be in the auto quiet mode for a long time, and the data that needs to be processed in the system can be indicated to be few in a long time. To reduce the power consumption of the system, the processor can be in the sleep mode for a long time. That is, the wake-up period of the processor in the sleep mode can be prolonged to increase the time length that the processor is in the sleep mode.

In addition, in a process of adjusting the wake-up period when the processor is in the sleep mode based on the power consumption data when the system is in the operating state, setting of an application that is currently in the operation state may need to be considered in the system. If the application that is currently in the operation state has a specific requirement on the processor, the wake-up period when the processor is in the sleep mode can be determined by considering the specific requirement of the application and the power consumption data.

The wake-up period when the processor is in the sleep mode can correspond to a wake-up frequency.

In the processor power consumption control method of embodiments of the present disclosure, if the processor is woken up by the polling event, the wake-up period can be adjusted when the processor is in the sleep mode based on the power consumption data of the processor when the system is in the operating state. Thus, the wake-up period of the processor can be adjusted based on different volumes of the data required by different power consumption states when the system is in the operating state. If the power consumption is high, a larger volume of data can be required, and the wake-up period of the processor may need to be shortened. If the power consumption is low, a smaller volume of data can be required, and the processor may not need to be woken up frequently. Thus, the wake-up period of the processor can be prolonged, which prevents the processor from being always in the wake-up mode to increase the power consumption of the system when the system is in the operating state.

Figure 5:
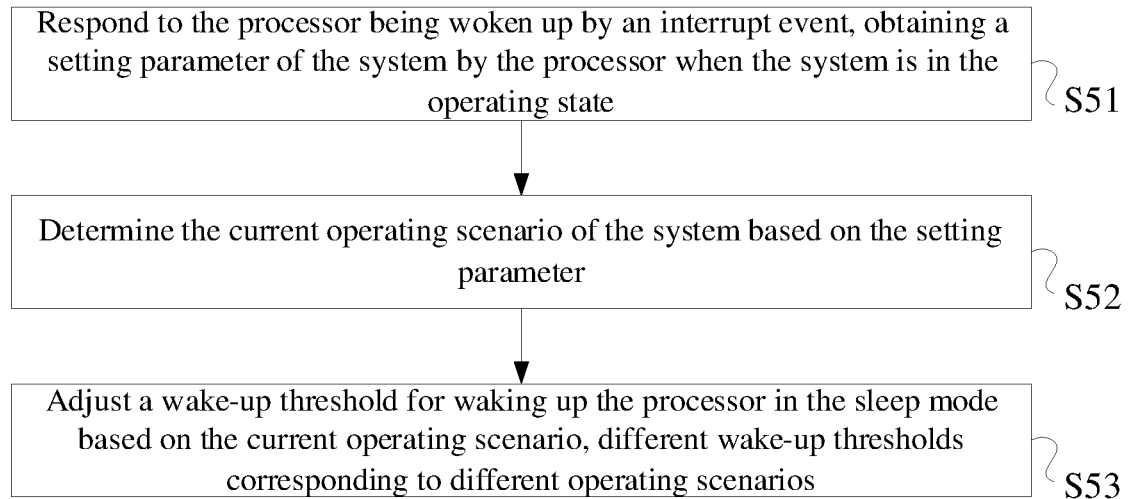
FIG. 5 illustrates a schematic flowchart of a processor power consumption control method according to embodiments of the present disclosure.

Embodiments of the present disclosure provide a processor power consumption control method. A flowchart of the method is shown in FIG. 5. The method includes the following processes.

At S51, responding to the processor being woken up includes waking up the processor in response to an interrupt event, and obtaining a setting parameter of the system by the processor when the system is in the operating state.

At S52, the current operating scenario of the system is determined based on the setting parameter.

At S53, a wake-up threshold for waking up the processor in the sleep mode is adjusted based on the current operating scenario. Different wake-up thresholds correspond to different operating scenarios.

The processor can be woken up in response to the interrupt event. When the processor is in the wake-up mode, the interrupt event can be set. The interrupt event can be an corresponding event detected when the processor is in the sleep mode. The event can interrupt the sleep mode. The interrupt event can be data detected by the system. The sleep mode of the processor can be interrupted based on the data. When the processor is in the sleep mode, if the interrupt event is obtained, the sleep mode of the processor can be interrupted based on the interrupt event to switch the processor to the wake-up mode.

The interrupt event can include data detected by the sensors arranged in the system. For example, distance-related data detected by a time of flight (TOF) distance sensor, and image change data detected by an image acquisition device.

When the processor is in the wake-up mode, if the user sets the parameter of the system or a parameter of the operating system based on the user changes, the processor can obtain the setting parameter. Based on the setting parameter, the current corresponding interrupt event of the system can be determined. Different setting parameters can correspond to different interrupt events. Thus, when the processor is woken up based on the interrupt event, the setting parameter may need to be determined first to determine the corresponding interrupt event.

For example, a first setting parameter can correspond to a first interrupt event, and a second setting parameter can correspond to a second interrupt event. If the current setting parameter is the first setting parameter, the sleep mode of the processor can be interrupted only when the first interrupt event is detected. If the second interrupt event is detected, the sleep mode of the processor cannot be influenced.

For example, the setting parameter can be a gesture detection. When a gesture is detected, the interrupt event can be indicated to occur. The setting parameter can be that the display is turned off when a distance between a user and the apparatus satisfies a condition. Then, when the distance between the user and the apparatus is detected to satisfy the condition, the interrupt event can be indicated to occur.

The current operating scenario of the system can be determined based on the setting parameter. That is, different setting parameters can correspond to different operating scenarios. For example, a scenario for gesture detection can be different from a scenario for distance detection. The wake-up threshold can be adjusted based on the operating scenario after the operating scenario is determined. The wake-up threshold can be a threshold of the wake-up mode used to wake up the processor. That is, as long as the wake-up threshold is reached, the processor can be switched from the sleep mode to the wake-up mode. Then, the processor can be woken up.

For example, the first setting parameter can correspond to a first operating scenario, and the wake-up threshold corresponding to the first operating scenario can be 20 cm. The second setting parameter can correspond to a second operating scenario, and the wake-up threshold corresponding to the second operating scenario can be 40 cm. If the current setting parameter is determined to be the second setting parameter, the processor can be switched from the sleep mode to the wake-up mode only when the wake-up value reaches 40 cm. If the wake-up value is only 20 cm, the processor cannot be woken up in the current operating scenario.

Further, determining the current operating scenario of the system based on the operating parameter can include determining a trigger mode of the system in the current operating state based on the setting parameter when the system is in the operating state. In different trigger modes, sensors of the system can correspond to different wake-up thresholds.

The operating scenario can be the trigger mode. Different operating scenarios can be different trigger modes. Different setting parameters can correspond to different trigger modes. Different trigger modes can correspond to different wake-up thresholds of the sensors in the system.

In an interrupt event, whether the interrupt event occurs can be determined based on data detected by a sensor in the system. Whether the sleep mode of the processor can be interrupted can be determined by determining the operating state of the sensor.

The sensor can at least include two operating states, that is a first operating state and a second operating state. In the first operating state, the sensor can only detect data and cannot send the detected data to the processor. In the second operating state, the sensor can detect the data can send the detected data to the processor.

If the sensor is always in the second operating state when the processor is in the sleep mode, the sensor can always detect the data. When the sensor detects the data, the sensor can send the data to the processor. Thus, the processor can be woken up to process the detected data. Therefore, the processor can be in the wake-up mode for a long time, and the processor can only process detected invalid data for a relatively long time. Then, the power consumption of the system can be increased.

Based on this, the sensor of embodiments of the present disclosure can have two operating states. When the processor is in the sleep mode, the sensor can work in the first operating state. The sensor can only detect the data but cannot send the data. As long as the sensor does not send the data to the processor, the processor may not need to be switched to the wake-up mode. Only when the data detected by the sensor satisfies the requirement, the sensor can send the data to the processor. Then, the processor can be woken up. Thus, the wake-up threshold used to wake up the processor in the sleep mode can be a wake-up threshold of the sensor.

When the sensor is in the first operating state, that is, the sensor can only detect the data and cannot send the data, the processor can be in the sleep mode. When the sensor is in the second operating state, that is, the sensor can detect the data and send the detected data to the processor, the processor can be switched from the sleep mode to the wake-up mode. Thus, the operating state of the sensor can correspond to the mode of the processor.

The trigger mode can be determined based on the setting parameter. The trigger mode can correspond to the wake-up threshold of the sensor to control the wake-up of the processor. When the processor is in the wake-up mode, the setting parameter can be obtained. The trigger mode can be determined based on the setting parameter. Different trigger modes actually correspond to different wake-up thresholds. When the trigger mode is determined, the wake-up threshold can be determined. If the processor is switched to the sleep mode, the sensor can be in the first operating state. The sensor can detect the data. Whether the detected data satisfies the wake-up threshold can be determined in the detection process. Only when the detected data satisfies the wake-up threshold, the sensor can be adjusted to be in the second operating state. As long as the sensor is adjusted to be in the second operating state, the processor can be woken up and switched from the sleep mode to the wake-up mode.

The trigger mode can be determined based on the setting parameter. That is, the trigger threshold of the sensor can be determined based on the setting parameter. The trigger threshold of the sensor can be used to trigger the sensor to be switched from the first operating state to the second operating state. After the trigger threshold is determined, whether the mode of the processor is switched can be determined according to whether the detected data by the sensor satisfies the trigger threshold.

The processor power consumption control method of embodiments of the present disclosure can include obtaining the setting parameter when the processor is in the wake-up mode, and determining the trigger threshold of the sensor in the system based on the setting parameter. After the processor is switched to the sleep mode, and when the sensor is in the first operating state, the sensor can only detect the data. The sensor can only be switched to the second operating state when the detected data by the sensor satisfies the trigger threshold. The sensor can upload the detected data. When the sensor is switched to the second operating state, the processor can be woken up when the detected data by the sensor satisfies the trigger threshold. In some other embodiments, the processor can be woken up when the sensor is switched to the second operating state.

For example, the setting parameter can be gesture detection. Since the gesture detection requires a high detection precision, when a value detected by the TOF for distance detection reaches 10 cm, the TOF can be switched to the second operating state. The processor can be woken up, and the trigger threshold can be 10 cm. If the user leaves the system lock, the precision requirement can be moderate. Thus, the trigger threshold can be set to 20 cm. That is, the processor can be woken up to lock the system as long as no user is detected within 20 cm. In some other embodiments, after the user leaves the system lock, the processor can be woken up when the user is detected to be back. Then, since a movement amplitude of the user is relatively large, the trigger threshold can be set to 40 cm. That is, the processor can be woken up for the user to operate as long as the user is detected within 40 cm.

Figure 6:
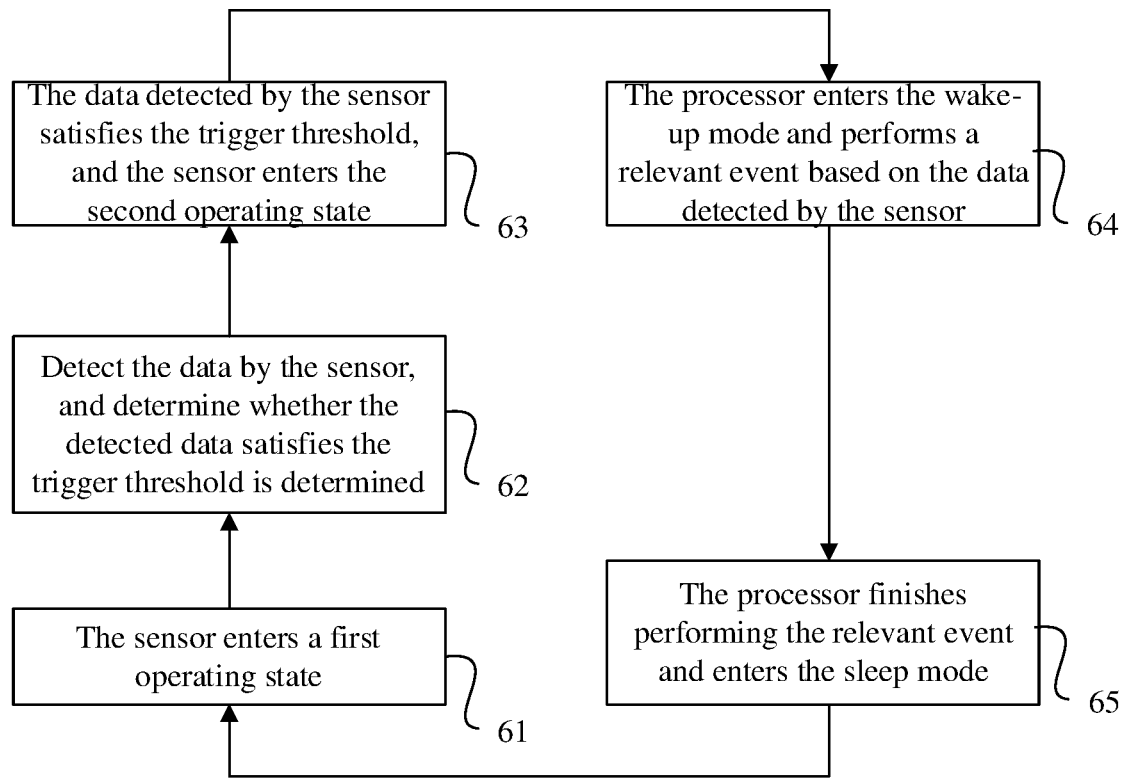
FIG. 6 illustrates a schematic flowchart of a processor power consumption control method according to embodiments of the present disclosure.

In some embodiments, the flowchart of the processor power consumption control method is shown in FIG. 6. The method includes the following processes.

At S61, the sensor enters a first operating state.

At S62, the sensor detects the data, and whether the detected data satisfies the trigger threshold is determined.

At S63, the data detected by the sensor satisfies the trigger threshold, and the sensor enters the second operating state.

At S64, the processor enters the wake-up mode and performs a relevant event based on the data detected by the sensor.

At S65, the processor finishes performing the relevant event and enters the sleep mode. Performing the relevant event by the processor based on the data detected by the sensor can include performing relative processing on the data detected by the sensor, determining whether the trigger threshold of the sensor is adjusted based on the detected data and the setting parameter, adjusting the trigger threshold of the sensor when the trigger threshold needs to be adjusted, and determining whether the sensor enters the second operating state based on the adjusted trigger threshold when the sensor enters the first operating state.

The processor of embodiments of the present disclosure can be an artificial intelligence (AI) chip or a central processing unit (CPU).

In the processor power consumption control method of embodiments of the present disclosure, if the processor is woken up by the interrupt event, the wake-up threshold used to wake up the processor in the sleep mode can be adjusted based on the operating state of the system. Since the setting parameter is different, the detection precision of the sensor can be different. Thus, the wake-up threshold of the sensor can be adjusted based on the setting parameter. Thus, the wake-up threshold of the processor in the sleep mode can be realized to reduce the number of times of waking up the processor based on invalid data.

Figure 7:
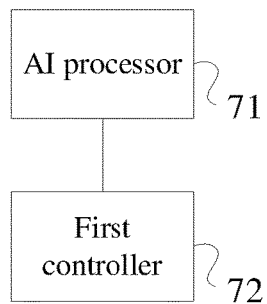
FIG. 7 illustrates a schematic structural diagram of a processor power consumption control system according to embodiments of the present disclosure.

Embodiments of the present disclosure provide a power consumption control system with the AI processor. FIG. 7 illustrates a schematic structural diagram of a processor power consumption control system according to embodiments of the present disclosure. The processor power consumption control system includes an AI processor 71 and a first controller 72.

The AI processor can include a wake-up mode and a sleeping mode. The first controller can be configured to control the system to run.

Figure 8:
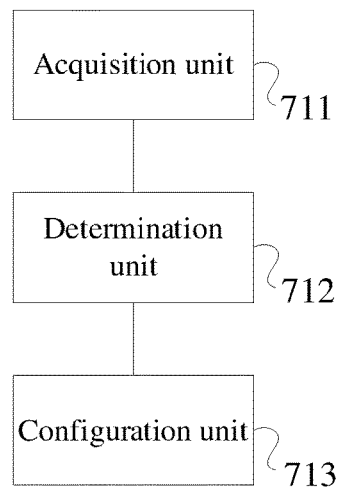
FIG. 8 illustrates a schematic diagram of an AI processor according to embodiments of the present disclosure.

Further, FIG. 8 illustrates a schematic diagram of the AI processor 71 according to embodiments of the present disclosure. The AI processor 71 includes an acquisition unit 711, a determination unit 712, and a configuration unit 713.

The acquisition unit 711 can be configured to obtain the operating parameter when the system is in the operating state in response to the AI processor being woken up.

The determination unit 712 can be configured to determine the current operating scenario of the system based on the operating parameter.

The configuration unit 713 can be configured to configure the data related to the wake-up frequency of the AI processor based on the current operating scenario. Different operating scenarios can correspond to different wake-up frequencies of the AI processor.

Figure 9:
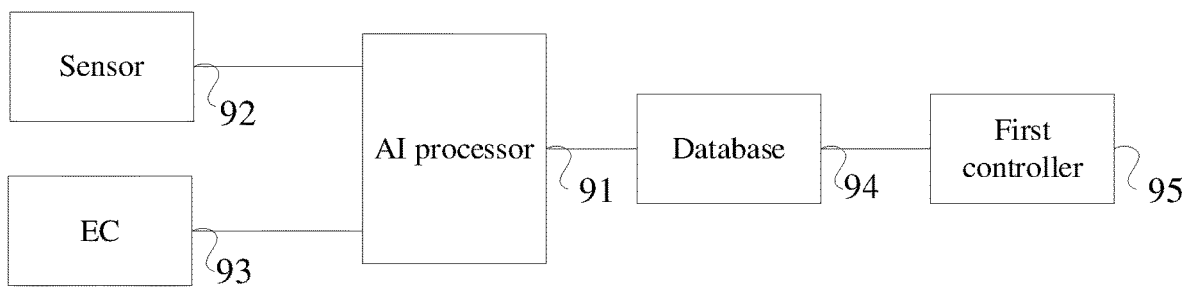
FIG. 9 illustrates a schematic structural diagram of a processor power consumption control system according to embodiments of the present disclosure.

In some embodiments, FIG. 9 illustrates a schematic structural diagram of the processor power consumption control system according to embodiments of the present disclosure. The processor power consumption control system includes an AI processor 91, a sensor 92, an EC 93, a database 94, and a first controller 95.

The first controller 95 can be configured to obtain various data of the AI processor from the database 94 and adjust the setting parameter of the system based on the obtained various data. The various data of the AI processor can be stored in the database. The AI processor can obtain the data of the sensor based on the interrupt event and obtain the data sent by the EC based on the polling event.

The power consumption control system of the AI processor of embodiments of the present disclosure can be implemented based on the processor power consumption control method above, which is not repeated here.

The power consumption control system of the AI processor of embodiments of the present disclosure can include the AI processor and the first controller. The AI processor can include the wake-up mode and the sleep mode. If the AI processor is always in the wake-up mode, the power consumption of the system can be increased, the data of the AI processor related to the wake-up frequency can be adjusted based on the operating parameter when the system is in the operating state. Thus, the AI processor can be in the sleep mode. The time length in which the processor is in the sleep mode can be prolonged or shortened based on the operating parameter when the system is in the operating state. Thus, the power consumption of the system can be reduced since the AI processor can be in the sleep mode.

Embodiments of the present disclosure provide an electronic apparatus, including the first controller and the AI processor.

The first controller can be configured to control the operation of the system where the electronic apparatus is located.

the AI processor can be configured to obtain the operating parameter of the system from the first controller when the system is in the operating state in response to the AI processor being woken up. The AI processor can be further configured to determine the current operating scenario of the system based on the operating parameter and configured the data relevant to the wake-up frequency of the AI processor based on the current operating scenario. Different operating scenarios can correspond to different wake-up frequencies of the AI processor.

The electronic apparatus of embodiments of the present disclosure can include the first controller and the AI processor. The AI processor can include the wake-up mode and the sleep mode. If the AI processor is always in the wake-up mode, the power consumption of the system can be increased. The data of the AI processor relevant to the wake-up frequency can be adjusted based on the operating parameter when the system is in the operating state to cause the AI processor to be in the sleep mode. The time length in which the AI processor is in the sleep mode can be prolonged or shortened based on the operating parameter when the system is in the operating state. Thus, the AI processor can be in the sleep mode to reduce the power consumption of the system.

Embodiments of the present disclosure further provide a readable storage medium storing a computer program that, when loaded and executed by a processor, causes the processor to perform the processor power consumption control methods. For a specific implementation, reference can be made to a relevant part of above embodiments, which is not repeated here.

The present disclosure further provides a computer program product or a computer program. The computer program product or the computer program can include computer instructions. The computer instructions can be stored in a computer-readable storage medium. The processor of the electronic apparatus can read the computer instructions from the computer-readable storage medium. The processor can perform the computer instructions to cause the electronic apparatus to perform the above processor power consumption control methods or the methods provided by embodiments of the processor power consumption control system. For a specific implementation process, reference can be made to the description of corresponding embodiments, which is not repeated here.

Embodiments in the present description are described in a progressive manner. Each embodiment focuses on differences from other embodiments. The same and similar parts among embodiments of the present disclosure can be referred to each other. The device disclosed by embodiments of the present disclosure can correspond to the method disclosed by embodiments of the present disclosure. Thus, the description can be simple, and the relevant places can be referred to the description of the method.

Those skilled in the art can further understand that the various units and algorithm processes described in connection with embodiments of the present disclosure can be implemented as electronic hardware, computer software, or a combination thereof. To describe the interchangeability of hardware and software, the composition and processes of embodiments of the present disclosure are generally described above according to functions. Whether the functions are performed by hardware or software depends on a specific application or design constraints of the technical solution. Those skilled in the art can implement the described functions in different methods for each specific application, which are within the scope of the present disclosure.

The steps of the method or algorithm described in connection with embodiments of the present disclosure can be implemented directly by hardware, a software module executed by the processor, or a combination thereof. The software module can be arranged in random access memory (RAM), memory, read-only memory (ROM), electrically programmable ROM, electrically erasable programmable ROM, a register, hard disk, a removable disk, a CD-ROM, or any other form of storage medium.

The above description of embodiments of the present disclosure can enable those skilled in the art to make or use the present disclosure. Various modifications to these embodiments will be apparent to those skilled in the art. The generic principles defined here can be applied to other embodiments without departing from the spirit or scope of the present disclosure. Thus, the present disclosure is not intended to be limited to embodiments of the present disclosure but conforms to the widest scope consistent with the principles and novel features of the present disclosure.

What is claimed is:

1. A processor power consumption control method, comprising:
   responding to a processor being woken up by a polling event, obtaining an operating parameter of a system by the processor when the system is in an operating state, the operating parameter including power consumption data;
   determining a current operating scenario of the system based on the operating parameter, including determining a power consumption mode of the system in the current operating state based on the power consumption data in the operating parameter;
   configuring data related to a wake-up frequency of the processor based on the current operating scenario, different operating scenarios corresponding to different wake-up frequencies of the processor; and
   in response to determining, based on the operating parameter, that a number of times when the system is continuously in a low power consumption mode in a current state reaches a predetermined number of times, prolonging a wake-up period when the processor is in a sleep mode.

2. The method of claim 1, further comprising:
   responding to the processor being woken up by an interrupt event, obtaining a setting parameter corresponding to the interrupt event by the processor when the system is in the operating state, the operating parameter further including the setting parameter; wherein:
   configuring the data related to the wake-up frequency of the processor based on the current operating scenario further includes:
   adjusting a wake-up threshold of the processor in the sleep mode based on the current operating scenario.

3. The method of claim 2, wherein determining the current operating scenario of the system based on the operating parameter further includes:
   determining a trigger mode of the system in the current operating state based on the setting parameter of the system in the operating state.

4. The method of claim 3, wherein adjusting the wake-up threshold of the processor in the sleep mode based on the current operating scenario includes:

determining a wake-up threshold of a sensor of the system based on the trigger mode of the system in the current operating state;

in response to detection data of the sensor satisfying the wake-up threshold of the sensor, adjusting an operating state of the sensor; and controlling the processor to be in a wake-up mode based on the operating state of the sensor.

5. The method of claim 4, wherein controlling the processor to be in the wake-up mode based on the operating state of the sensor includes:

in response to the sensor being determined to be in a first operating state, controlling the processor to be in the sleep mode based on the sensor being in the first operating state; and in response to the sensor being determined to be in a second operating state, controlling the processor to be in the wake-up mode;

wherein:

when the sensor is in the first operating state, the sensor only detects; and when the sensor is in the second operating state, the sensor is configured to detect and send the detected data to the processor to interrupt the sleep mode of the processor.

6. An electronic apparatus, comprising:

a first controller configured to control an operation of a system where the electronic apparatus is located; and an artificial intelligence (AI) processor configured to:

responding to the AI processor being woken up by an interrupt event, obtain, from the first controller, an operating parameter when the system is in an operating state, the operating parameter including a setting parameter corresponding to the interrupt event;

determine a current operating scenario of the system based on the operating parameter;

determine a trigger mode of the system in the current operating state based on the setting parameter of the system in the operating state;

configure data relevant to a wake-up frequency of the AI processor based on the current operating scenario, different operating scenarios corresponding to different wake-up frequencies of the AI processor; and adjust a wake-up threshold of the AI processor in a sleep mode based on the current operating scenario.

7. The electronic apparatus of claim 6, wherein the AI processor is further configured to:

determine a wake-up threshold of a sensor of the system based on the trigger mode of the system in the current operating state;

in response to detection data of the sensor satisfying the wake-up threshold of the sensor, adjust an operating state of the sensor; and control the AI processor to be in a wake-up mode based on the operating state of the sensor.

8. The electronic apparatus of claim 7, wherein the AI processor is further configured to:

in response to the sensor being determined to be in a first operating state, control the AI processor to be in the sleep mode based on the sensor being in the first operating state; and in response to the sensor being determined to be in a second operating state, control the AI processor to be in the wake-up mode;

wherein:

when the sensor is in the first operating state, the sensor only detects; and when the sensor is in the second operating state, the sensor is configured to detect and send the detected data to the AI processor to interrupt the sleep mode of the AI processor.

9. The electronic apparatus of claim 6, wherein the AI processor is further configured to:

responding to the AI processor being woken up by a polling event, obtain, from the first controller, the operating parameter of the system when the system is in the operating state, the operating parameter further including power consumption data; and adjust a wake-up period when the AI processor is in a sleep mode based on the current operating scenario.

10. The electronic apparatus of claim 9, wherein the AI processor is further configured to:

determine a power consumption mode of the system in the current operating state based on the power consumption data in the operating parameter; and adjust the wake-up period when the AI processor is in the sleep mode based on the power consumption mode.

11. The electronic apparatus of claim 10, wherein the AI processor is further configured to:

in response to determining, based on the operating parameter, that a number of times when the system is continuously in a low power consumption mode in a current state reaches a predetermined number of times, prolong the wake-up period when the AI processor is in the sleep mode.

12. A processor power consumption control method, comprising:

responding to a processor being woken up by an interrupt event, obtaining an operating parameter of a system by the processor when the system is in an operating state, the operating parameter including a setting parameter corresponding to the interrupt event;

determining a current operating scenario of the system based on the operating parameter;

determining a trigger mode of the system in the current operating state based on the setting parameter of the system in the operating state;

adjusting a wake-up threshold of the processor in a sleep mode based on the current operating scenario, the wake-up threshold of the processor being related to a wake-up frequency of the processor, and different operating scenarios corresponding to different wake-up frequencies of the processor.

13. The method of claim 12, wherein adjusting the wake-up threshold of the processor in the sleep mode based on the current operating scenario includes:

determining a wake-up threshold of a sensor of the system based on the trigger mode of the system in the current operating state;

in response to detection data of the sensor satisfying the wake-up threshold of the sensor, adjusting an operating state of the sensor; and controlling the processor to be in a wake-up mode based on the operating state of the sensor.

14. The method of claim 13, wherein controlling the processor to be in the wake-up mode based on the operating state of the sensor includes:

in response to the sensor being determined to be in a first operating state, controlling the processor to be in the sleep mode based on the sensor being in the first operating state; and in response to the sensor being determined to be in a second operating state, controlling the processor to be in the wake-up mode;

wherein:
  when the sensor is in the first operating state, the sensor only detects; and
  when the sensor is in the second operating state, the sensor is configured to detect and send the detected data to the processor to interrupt the sleep mode of the processor.

* * * * *